Patented Aug. 23, 1949

2,479,744

UNITED STATES PATENT OFFICE 2,479,744

2-(N-PIPERIDINO-METHYL)-INDANES, THEIR SALTS AND PREPARATION THEREOF

Karl Hoffmann and Henri Schellenberg, Basel, and Karl Miescher, Riehen, Switzerland, assignors to Ciba Pharmaceutical Products Inc., Summit, N. J., a firm No Drawing. Application March 10, 1945, Serial No. 582,188. In Switzerland January 4, 1944

7 Claims. (Cl. 260—293)

In application Serial No. 535,740, filed May 15, 1944, now U. S. Patent No. 2,441,069, granted May 4, 1948, is described a process for the manufacture of amines which consists in subjecting indane compounds which contain in the five-membered ring an amino-alkyl group and as further substituent a free or substituted hydroxyl group, to a treatment which eliminates the latter substituent together with the hydrogen atom attached to a neighboring carbon atom with the formation of a double bond, and, if desired, converting these amines into their ammonium compounds. The aminoalkyl-indenes thus obtained are characterized in particular by their uterotonic activity. It has now been found that corresponding compounds saturated in the five-membered ring are, surprisingly, just as valuable uterotonics.

The present invention relates to a process for the manufacture of amines which consists in treating indane compounds which contain in 2-position of the five-membered ring an aminoalkyl group substituted at the nitrogen atom and as a further nuclear grouping a keto group, a free or substituted carbinol group or an alkylene group, with reducing agents to remove the oxygen or saturate the unsaturated group, and, if desired, causing agents which form quaternary compounds to act on the resulting products.

The starting materials can further be substituted in one or both rings and contain a secondary or tertiary amino group. With regard to the starting materials which can be used, reference is made inter alia to the above mentioned specification.

Agents which are suitable for removing oxygen from the compounds containing carbonyl groups are described for example in Houben, "Die Methoden der organischen Chemie," 3rd edition, vol. 2, pages 276–279. Accordingly, when starting from indanones which contain in the five-membered ring an aminoalkyl group, for example catalytically activated hydrogen, further also phosphorus and hydriodic acid or amalgamated zinc and hydrochloric acid can be used as reducing agents. The catalytic reduction can be carried out in the presence of noble catalysts, such as platinum, palladium or if desired on a catalyst carrier. It is preferable to work in anhydrous fatty acids, such as glacial acetic acid or propionic acid, and also in the presence of mineral acids, such as sulfuric acid, hydrochloric acid, perchloric acid, zinc chloride-hydrochloric acid, or, e. g., of boron fluoride-acetic acid. If necessary, the reduction is performed at a raised temperature and/or under increased pressure. If the aminoketones used as starting materials are little stable in the free state, it is advantageous to start from their salts and work in an acid or neutral solution. The corresponding compounds which contain in the five-membered ring instead of the keto group a free or substituted, particularly esterified carbinol group or an alkylene group, can be reduced in analogous manner. Moreover, also catalytic reduction in the presence of base catalysts, such as e. g. nickel or nickel-cobalt, is suitable for the reduction of an alkylene group. Suitable solvents are for example alcohol, dioxane, water, etc.

The 2-aminoalkyl-indanes obtained in this way generally distil off undecomposed, are stable and yield water-soluble salts which crystallize well. If desired, they can be converted into the corresponding ammonium compounds according to known methods.

The new compounds find application in therapy or as intermediate products for the manufacture of compounds for therapeutic application.

The following examples illustrate the invention, but are not to be regarded as limiting it in any way, the parts being by weight:

Example 1

7.5 parts of 2-(N-piperidino-methyl)-indene-hydrochloride of melting point 227–228° C. of the formula

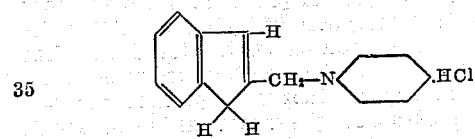

(prepared, e. g., from α-indanone by condensation with paraformaldehyde and piperidine hydrochloride, reduction of the resulting 1-oxo-2-(N-piperidino-methyl)-indane-hydrochloride of melting point 214° C. with sodium amalgam to the corresponding 1-hydroxy compound of melting point 206.5–207° C. and subsequent elimination of water) are dissolved in 50 parts of absolute alcohol and the acid solution is neutralized with about 30 parts of 1-N caustic soda solution. 15 parts of previously reduced nickel catalyst are added to the solution and the whole is shaken with hydrogen at room temperature. The hydrogenation ceases practically after 1 mol of hydrogen has been absorbed. The filtered reaction solution is evaporated and the residue distilled. It boils at 110–112° C. under 0.35 mm.

pressure. The 2-(N-piperidino-methyl)-indane thus obtained of the formula

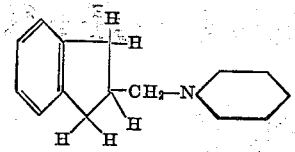

forms a water-soluble hydrochloride crystallizing in leaflets, which is recrystallized from a mixture of alcohol and acetic ester, sinters at 218° C. and melts at 220–221° C.

To a warm solution of 1.2 parts of 2-(N-piperidino-methyl)-indane in 2.5 parts of acetone there is added 1 part of methyl iodide. The mixture is allowed to stand until cool and the 2-(N-piperidino-methyl) - indane - iodomethylate formed filtered off and recrystallized from a mixture of alcohol and ethyl acetate.

The same final products are also obtained when reducing 1-hydroxy-2-(N-piperidino-methyl)-indane or a corresponding acyloxy-derivative such as the acetoxy- or benzoyloxy-derivative with hydrogen in the presence of, e. g., palladium-barium sulfate-catalyst and sulfuric acid in a glacial acetic acid solution.

The 2-(dimethylamino-methyl)-indane, the hydrochloride of which melts at 189–190° C. or the 2-(N-morpholino-methyl)-indane are obtained in analogous manner.

*Example 2*

2 parts of concentrated hydrochloric acid are added to a solution of 10.6 parts of 1-oxo-2-(N-piperidino-methyl)-indane-hydrochloride of the formula

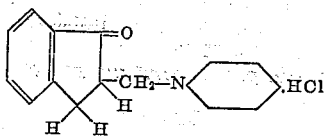

(prepared, e. g., as indicated in Example 1) in 200 parts of glacial acetic acid and the whole is shaken with 0.2 part of platinum oxide at about 60° C. in an atmosphere of hydrogen. After the quantity of hydrogen calculated for 2 mols has been absorbed, the mixture is allowed to cool, the filtered reaction solution is evaporated and the base is liberated from the crystallized residue with caustic soda solution. For the purpose of purification the precipitated oil is taken up in ether, the ethereal solution is shaken with 2n-hydrochloric acid, the hydrochloric extract is alkalized with ammonia and the base is again taken up in ether. The residue of the ethereal solution is distilled in a high vacuum. The main fraction which passes over at 96–98° C. under 0.1 mm. pressure proves to be identical with the 2-(N-piperidino-methyl)-indane obtained according to Example 1.

When using 1-oxo-2-(methylaminomethyl)-indane-hydrochloride of melting point 158–159° C. (prepared according to the aforesaid application) as starting material, there is obtained 2-(methylamino-methyl)-indane in analogous manner, which forms a hydrochloride of melting point 205–207° C.

*Example 3*

If the reaction is conducted in an analogous manner as in Example 1 but with use of 1-methyl-2-(N-piperidino-methyl)-indene of the formula

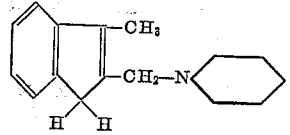

there is obtained the 1-methyl-2-(N-piperidino-methyl-2-(N-piperidino-methyl)- indane of the formula

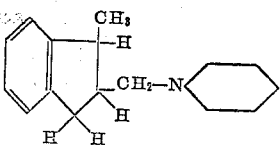

as an oil which forms a crystalline water-soluble hydrochloride.

In a quite similar manner there are obtained other derivatives substituted in the 5-membered ring and/or in the aromatic nucleus, particularly for example 1-ethyl-, 1-propyl-, 1-isopropyl-, 1-butyl-, 1-phenyl-, 1-benzyl-indane derivatives, which contain in the 2-position an amino-methyl group substituted at the nitrogen atom.

The ring numbering in the indane compounds in the present specification is in accordance with the scheme:

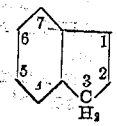

What we claim is:

1. A process for the manufacture of an amine, which comprises treating an indane compound which contains an N-piperidino-methyl group in the 2-position of the five-membered ring and a member selected from the class consisting of a keto group, a carbinol group, a substituted carbinol group and an alkylene group in the 1-position of the five-membered ring, with hydrogen in the presence of a catalyst selected from the group consisting of platinum and palladium at atmospheric pressure and at a temperature not substantially in excess of 60° C., whereby the reduction takes place without affecting the degree of unsaturation of the six-membered carbon ring of the indane compound.

2. A process for the manufacture of an amine, which comprises treating 2-(N-piperidino-methyl)-indene with hydrogen in the presence of platinum at atmospheric pressure and at room temperature, whereby the five-membered ring of the said indene is saturated without, however, affecting the degree of unsaturation of the six-membered carbon ring thereof, so that the 2-(N-piperidino-methyl)-indane is produced.

3. A process for the manufacture of an amine, which comprises treating 1-hydroxy-2-(N-piperidino-methyl)-indane with hydrogen in the presence of platinum and of mineral acid at atmospheric pressure and at room temperature, whereby the five-membered ring of the said indane is freed from oxygen and is saturated without, however, affecting the degree of unsaturation of the six-membered carbon ring thereof, so that the 2-(N-piperidino-methyl)-indane is produced.

4. A process for the manufacture of an amine, which comprises treating 1-oxo-2-(N-piperidinomethyl)-indane with hydrogen in the presence of platinum and of mineral acid at atmospheric pressure and at about 60° C., whereby the five-membered ring of the said indane is freed from oxygen and is saturated without, however, affecting the degree of unsaturation of the six-membered carbon ring thereof, so that the 2-(N-piperidino-methyl)-indane is produced.

5. A member selected from the group consisting of the indane compounds which are saturated in the five-membered ring and contain in the 2-position an N-piperidino-methyl group, the nitrogen atom of which is connected to the said five-membered ring through the methyl group, and their salts and ammonium compounds.

6. The 2-(N-piperidino-methyl)-indane of the formula

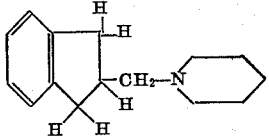

7. The hydrochloride of 2-(N-piperidino-methyl)-indane, having a melting point of about 220–221° C.

KARL HOFFMANN.
HENRI SCHELLENBERG.
KARL MIESCHER.

REFERENCES CITED

The following references are of record in the file of this patent:

UNITED STATES PATENTS

| Number | Name | Date |
|---|---|---|
| 2,175,003 | Sly | Oct. 3, 1939 |
| 2,265,174 | Kendall | Dec. 9, 1941 |

FOREIGN PATENTS

| Number | Country | Date |
|---|---|---|
| 395,232 | Great Britain | July 13, 1933 |

OTHER REFERENCES

Patterson et al., "Ring Index" (Rheinhold Pub. Co., New York, 1940), page 134.

Fieser et al., "Organic Chemistry" (D. C. Heath & Co., Boston, 1944), page 543.

Beilstein, "Handbuch etc.," vol. 5, First Supplement, p. 234; vol. 5, Second Supplement, p. 411.

Certificate of Correction

Patent No. 2,479,744

August 23, 1949

KARL HOFFMANN ET AL.

It is hereby certified that error appears in the printed specification of the above numbered patent requiring correction as follows:

Column 4, line 13, after the word "methyl" first occurrence, strike out "-2-(N-piperidino-methyl";

and that the said Letters Patent should be read with this correction therein that the same may conform to the record of the case in the Patent Office.

Signed and sealed this 27th day of December, A. D. 1949.

[SEAL]

THOMAS F. MURPHY,
*Assistant Commissioner of Patents.*